Aug. 16, 1932.  M. C. TEAGUE  1,872,046
CLOSURE FOR CONTAINERS
Filed Jan. 25, 1929
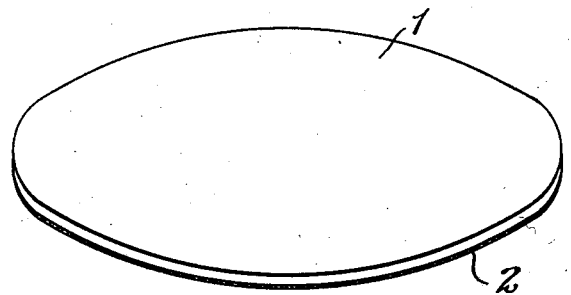
INVENTOR
Merwyn C. Teague
BY
ATTORNEY Patented Aug. 16, 1932

1,872,046

UNITED STATES PATENT OFFICE

MERWYN C. TEAGUE, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

CLOSURE FOR CONTAINERS

Application filed January 25, 1929. Serial No. 335,150.

This invention relates to closures for containers such as bottles, cans and the like.

In the search for a suitable closure for fluid containing vessels it has been found that rubber is a very desirable material for forming a seal either for glass containers or metal containers.

One form of rubber closure which has been used heretofore is a relatively thick disk cut from sheet rubber which has been milled, and calendered in the usual way. Such disks, however, usually contain a considerable quantity of rubber which renders them more expensive than is necessary and too expensive to be satisfactory especially if the disks are made of anything like pure rubber. Attempts have been made to reduce the cost of such disks by adding cheap fillers to the rubber mix. While this effects a reduction in the cost of such closures, yet they are still relatively expensive and the addition of the fillers is attended by further disadvantages such as odors which often accompany fillers and also due to the fact that many such fillers are either soluble in water or in organic solvents. This results in a closure which can be used only with one or the other of water containing liquids or organic solvents which is undesirable inasmuch as it is most economical to make one closure for all uses. Such water soluble constituents as are found in closures are undesirable in that they contaminate the liquids with which they are used and also due to the fact that cerain constituents of the closure are dissolved out and the seal is rendered less perfect. The same objection applies to rubber closures in which organic soluble fillers are used.

In order to reduce the amount of rubber used in a closure, it has been attempted to unite sheets of paper and rubber so as to form a laminated closure. A closure may be made by directly calendering a rubber compound on to a paper backing. This type of closure has the objection that due to uniting the rubber and paper by calendering, the strength of the paper is greatly reduced and a poor mechanical bond is obtained between the rubber and paper which results in closures liable to destruction by the separation of the rubber and paper. Another objection to this type of closure is that in order to efficiently carry out the calendering of the rubber upon paper, it is necessary to add substances to the rubber which soften it and render it more amenable to the calendering operation, which substances are open to the same objections as pointed out above in regard to the fillers used with the all rubber closure.

Closures of the rubber and paper laminated type may also be made by applying the rubber to the paper through the use of solvent cements which are flowed or spread upon the paper. Such a closure is objectionable in that it is very expensive due to the fact that a large number of coats of the cement must be applied because of the small rubber content available in cements. In addition the cap is rendered expensive due to the fact that such cements employ large quantities of expensive solvents which often are inflammable and also toxic thereby rendering the process of making the caps expensive, difficult and dangerous. This type of closure has the further objection that due to the method of application of the rubber mainly from cement, the rubber is in the unvulcanized state and cannot be vulcanized except by the use of high powered accelerators and by maintaining the laminated paper and rubber at a warm temperature over a considerable period of time which increases the cost of manufacture of the closure and also tends to dry out the paper backing and thereby render it less pliable and otherwise less satisfactory for use or by the sulphur chloride treatment which results in poor ageing.

It is the object of my invention to provide a new closure of the rubber paper laminated type in which the rubber is in such state as not to be readily soluble in either water or organic solvents and not to contain such soluble constituents. It is also the object of my invention to provide a closure of the rubber paper laminated type which is less expensive than those heretofore used due to the fact that less rubber is employed and also due to the fact that the process of making the same is less expensive. It is further the object of my invention to provide a rubber paper laminated type of enclosure giving an improved seal with a less quantity of rubber than those heretofore used.

Broadly, the invention comprises a closure of the laminated type made up of paper, fiber and rubber, the rubber being in the form of a coat deposited from a water dispersion of rubber. In the preferred form of the invention the water dispersion of rubber, if natural rubber latex, is one from which the water soluble constituents of the rubber have been removed and in which the rubber particles are partially or completely vulcanized. Another form of the invention may be that in which the water soluble constituents of the latex have been removed to a large extent, but in which the rubber has not been vulcanized, or at least not completely vulcanized. For some purposes it may be practical to employ a water dispersion of rubber from which the water soluble constituents have not been altered appreciably and in which the rubber has not been vulcanized.

The figure of the drawing shows the preferred form of the invention.

The article itself consists of a backing of paper 1 or like material having the necessary stiffness and strength to support a layer of sealing material 2 which consists of the rubber having the physical characteristics, the composition and prepared according to the method described hereinafter.

As above stated the preferred form of the invention involves coating a paper backing with a vulcanized water dispersion of rubber from which the water soluble constituents of the rubber have been removed and depositing the constituents of the dispersion upon the paper backing. In detail such a water dispersion may be prepared as follows: Normal rubber latex is creamed by the addition of .7 part of leo pectin dissolved in water and added to 100 parts of rubber as normal latex. After stirring this mixture is allowed to stand for about 24 hrs. so as to allow the latex to cream. At the end of this time the serum and the cream are separated. To the cream a quantity of water is added which is equal to the weight of the serum removed, and to the water cream mixture leo pectin is again added in the proportion of .45 part to 100 parts of rubber. This mixture is allowed to stand from 36-48 hrs. and the serum and cream again separated. This results in a cream having a solid content of 50-55% and in which the ammonia content is less than .2%. 2 parts of zinc oxide and 2 parts of colloidal sulphur to 100 parts of rubber are made into a smooth paste with water and added to the cream. 1 part per 100 of rubber of sulphonated oil, such as condensation product of an aromatic hydrocarbon with an aliphatic alcohol in the presence of sulphuric acid, is added to the cream and serves as a preservative and to increase the penetrating power of the dispersion. A sufficient quantity of water is added to the cream to bring the solid content of the mixture to about 35%, and 1 part to 100 parts of rubber of dibutyl dixanthic disulphide as an emulsion is added to the mixture which is followed by the addition of ½ part to 100 parts of rubber of aniline as an emulsion. This mixture is heated to 150° F. and slowly stirred for a period of about 16 hrs. after which the latex is strained while hot. The resulting water dispersion of rubber is one from which practically all water soluble constituents have been removed and in which the rubber particles have been partially or completely vulcanized.

A water dispersion of vulcanized rubber free from water solubles obtained as above described may be applied to one or both surfaces of a paper backing and at any desired location or zone. This operation may be carried out by flowing the dispersion on the paper although the dispersion may be applied by spreading or by the dipping of the paper in the dispersion or in any other suitable manner. The paper with the film of dispersion thereon is heated so as to dry the dispersion and accelerate the deposition of the solid constituents thereof. This heating may be carried out by passing the paper through a heated chamber. Depending upon the temperature of the heating chamber and the thickness of the rubber film, a layer of rubber may be laid down in this manner which has a thickness of from .005-.020 inch. Such a film is of practically pure vulcanized rubber which, due to the penetrating power of the dispersion made as above described, has an excellent mechanical bond with the paper. This layer of rubber is further characterized in that due to the fact that no milling operation has been applied to the rubber the rubber is in the grainless form or unmilled form, and, as well known in the art, such grainless or unmilled rubber is more highly resistant to the action of all solvents and to the action of ageing or oxidation than are the milled rubbers.

The ingredients specified in the above composition are intended to be merely exemplary of the class from which they are drawn. Other creaming agents than leo pectin, such as alginic acid and its salts or Iceland moss or Irish moss may be used. Other combinations of vulcanizing ingredients may be substituted for the dibutyl dixanthic disulphide and aniline combination. Examples of such other vulcanizing ingredients are zinc butyl xanthogenate with dibenzyl amine, or zinc dimethyl amino dithiocarbamate with zinc oxide and sulphur. In the case of the last mentioned vulcanizing ingredients, the product is heated longer than is necessary to dry the rubber dispersion so that vulcanization continues at room temperatures.

In the above described process (which is illustrative only of the invention and not intended to be limiting) I have disclosed the method of making a closure coated with vulcanized grainless or unmilled rubber substantially free from its water soluble constituents which coat or layer of rubber is of a thickness less than that ordinarily obtained by the process of applying a rubber sheet to paper by calendering. Inasmuch as any attempt to apply an equally thin film of rubber to a paper backing by calendering usually results in the tearing of the paper, and if the rubber be of high purity an unsatisfactory adhesion between the rubber and paper is obtained, or if the rubber be so compounded with oils and other ingredients as to improve its adhesive qualities, there then results an inferior quality of bottle cap closure which will not satisfactorily seal many liquids due to the solubility of the compounding ingredients in water or organic solvents. Due to the fact that the rubber of my preferred paper rubber laminated closure is pure, the closure is effective for sealing containers having water containing liquids therein, inasmuch as the water cannot act upon the rubber due to the fact that the water solubles have been removed. My closure is also very effective in connection with many organic solvents inasmuch as such solvents do not readily attack vulcanized rubber, especially vulcanized rubber which has not been milled, such as is the rubber of my closure. Due to the fact that the rubber content of a water dispersion made in the manner described above is relatively high as compared with that in the usual rubber cement, fewer applications of the dispersion are necessary to build up any desired thickness of rubber film as compared to that which would be necessary if a cement were used. Also I have avoided the use of expensive inflammable and toxic solvents by using water as the dispersing medium. Thus it is seen that the process of making my improved closure is a considerably less expensive one than those heretofore employed. Therefore I have succeeded in producing an inexpensive closure adapted to be used in sealing containers which have therein either water containing or many organic solvent containing substances.

While I have described the preferred form of my invention, other forms thereof may be employed such as that in which the step of vulcanizing the rubber is omitted from the above described process thereby resulting in a closure having a layer of unvulcanized, unmilled or grainless rubber which is relatively free of water soluble constituents. While such an unvulcanized rubber is not so effective against organic solvents, yet it is very effective in sealing water containing substances. My above described process may be further simplified by omitting the creaming steps and thereby retaining the water soluble constituents of the rubber which results in a closure having a layer of unvulcanized and unmilled and grainless rubber which contains water soluble constituents. While such closure may have a limited use it is not so satisfactory as those above described. My closure may be further made less expensive by the addition of odorless, colorless and non-soluble inert fillers preferably added to the vulcanized latex, examples of such fillers being inert mineral oil of the type known on the market as Nujol, or it may be a solid inert filler such as diatomaceous earth or whiting. While, of course, the pure rubber forms a better seal, yet for some purposes, a wholly satisfactory closure may be made by the above described process including the addition of such inert fillers as herein mentioned to vulcanized latex, which are less expensive than a pure rubber and paper filler because of the reducton of the amount of pure rubber. The above and other variations may be made in the process and product of this invention without departing from its broad underlying principle and other substances or materials than those named but having similar characteristics may be added to the latex (natural or artificial) within this invention.

An alternative method of preparing a closure having a rubber coating containing no water soluble constituents consists in applying a normal latex containing the usual water soluble constituents to a backing of paper or like material in the manner described hereinbefore. This coat of latex is dried and a surface coat of a tanning agent such as a solution of tannic acid or chromic acid or formaldehyde is applied over the dried rubber. The tanning agent acts upon the water soluble constituents of the rubber in such a manner as to render them insoluble thereby achieving a result similar to that obtained by removing substantially all of the water soluble materials as hereinbefore described.

The surface of the rubber film may or may not be coated with additional protective agents as desired. Such protective agents may be special rubber varnishes, styrol, cellulose lacquers, synthetic resin varnishes, etc. Another way of providing a protective film over the rubber is to incorporate a small amount of wax such as paraffin in the latex which, during drying or other operations, will migrate to the surface of the rubber and give a thin film of wax thereon which may act to protect the rubber against the action of certain liquids.

Having thus described my invention, what I claim and desire to protect by Letters Patent is:

1. A sealing closure comprising a layer of paper having at least one of its surfaces coated with a layer of grainless rubber substantially free of water soluble material.

2. A sealing closure comprising a layer of paper having at least one of its surfaces coated with a layer of rubber deposited from a water dispersion of rubber and substantially free of water solubles.

3. A sealing closure comprising a layer of paper having at least one of its surfaces coated with a layer of vulcanized grainless rubber substantially free of water soluble material.

4. A sealing closure comprising a layer of paper having at least one of its surfaces coated with a layer of rubber deposited from a water dispersion of vulcanized rubber and substantially free of water solubles.

5. A sealing closure comprising a layer of paper having at least one of its surfaces coated with a layer of unmilled rubber substantially free of water soluble material.

6. A sealing closure comprising a layer of paper having at least one of its surfaces coated with a layer of unmilled vulcanized rubber substantially free of water solubles.

7. A sealing closure comprising a layer of paper having at least one of its surfaces coated with a layer of unmilled vulcanized rubber substantially free of water soluble material and having a surface coat of solvent-resistant protective substance.

8. A sealing closure comprising a backing having a surface layer of grainless rubber substantially free of water soluble material which layer of rubber is adapted to contact with the materials sealed within a container.

9. A sealing closure comprising a backing having a surface layer of vulcanized grainless rubber substantially free of water soluble material which layer of rubber is adapted to contact with the materials sealed within a container.

10. A sealing closure adapted to withstand intimate contact with the material to be sealed which consists of a layer of paper having at least one of its surfaces coated with a layer of grainless rubber substantially free from water soluble material, and having a surface coat of protective agent.

11. A sealing closure adapted to withstand intimate contact with the material to be sealed which consists of a layer of paper having at least one of its surfaces coated with a layer of grainless rubber substantially free from water soluble material, and free from material soluble in organic solvents.

Signed at New York, New York, this 23rd day of January 1929.

MERWYN C. TEAGUE.